United States Patent [19]

Boissonnat et al.

[11] Patent Number: 5,431,555
[45] Date of Patent: Jul. 11, 1995

[54] EXTRUSION HEAD FOR PRODUCING YARNS FROM A MATERIAL WHICH HAS BEEN HEATED TO FORM A PASTE

[75] Inventors: Philippe Boissonnat, Barby; Robert Fedorowsky; Giordano Roncato, both of Aix Les Bains, all of France

[73] Assignee: Vetrotex France, Chambery, France

[21] Appl. No.: 30,126

[22] PCT Filed: Sep. 9, 1992

[86] PCT No.: PCT/FR92/00849

§ 371 Date: Mar. 10, 1993

§ 102(e) Date: Mar. 10, 1993

[87] PCT Pub. No.: WO93/04840

PCT Pub. Date: Mar. 18, 1993

[30] Foreign Application Priority Data

Sep. 10, 1991 [FR] France .................. 91 11165

[51] Int. Cl.⁶ ........................ B29C 47/12
[52] U.S. Cl. ................. 425/378.2; 425/382 R; 425/382.2
[58] Field of Search .......... 425/376.1, 378.1, 378.2, 425/382 R, 382.2, 72.2

[56] References Cited

U.S. PATENT DOCUMENTS

| | | | |
|---|---|---|---|
| 3,307,216 | 3/1967 | Dunn et al. | 425/464 |
| 3,608,137 | 9/1971 | Wilson | 425/465 |
| 3,970,417 | 7/1976 | Page | 425/72.2 |
| 4,376,746 | 3/1983 | Ward et al. | 425/382.2 |
| 4,842,504 | 6/1989 | Bentivoglio et al. | 425/378.1 |
| 4,875,846 | 10/1989 | Reinbold | 425/378.2 |

FOREIGN PATENT DOCUMENTS

| | | |
|---|---|---|
| 0323043 | 7/1989 | European Pat. Off. |
| 0435786 | 7/1991 | European Pat. Off. |
| 1245100 | 7/1967 | Germany |

*Primary Examiner*—Tim Heitbrink
*Attorney, Agent, or Firm*—Pennie & Edmonds

[57] ABSTRACT

An extrusion head (14) for producing yarn from a heat-plasticized material, including at least one body (16) defining a chamber (15) for distributing plasticized material over a plate (38) having extrusion openings formed therein. The chamber is supplied by an upper side channel (19) and comprises a downwardly decreasing cross-section of downward flow over at least a portion (24) of the vertical length of the chamber. This decrease is arranged to generate compressive and shear stresses over time in the plasticized material between the side supply channel (19) and the bottom of the chamber (27), said stresses being respectively substantially the same regardless of the path taken by said plasticized material.

21 Claims, 6 Drawing Sheets

EXTRUSION HEAD FOR PRODUCING YARNS FROM A MATERIAL WHICH HAS BEEN HEATED TO FORM A PASTE

BACKGROUND OF THE INVENTION

The present invention relates to extrusion heads for producing yarns from a thermoplastic material which is heated to form a paste, of the type comprising at least one body defining a pasty material distribution chamber above a horizontal plate perforated with extrusion apertures, the chamber being supplied with pasty material via at least one upper side feed duct extended about an axis in its terminal section connecting with the chamber.

A particularly important, although not exclusive, application of the invention is in the field of the manufacture of synthetic yarns from molten polymer.

Extrusion heads for producing synthetic yarns are already known. They comprise a body having a distribution zone for the pasty material and an extrusion chamber provided at its base with a spinning plate perforated with holes from which continuous filaments are formed. These filaments are gathered together so as to produce one or a more yarns.

The holes provided in the spinning plate can be distributed over a rectangular, triangular or annular surface.

In general the known extrusion heads further comprise a central molten polymer feed duct disposed along the axis of the extrusion head and of the yarn(s) produced.

In this type of extrusion head it is difficult, or even impossible, to introduce a central filiform component or core into the bundle of extruded synthetic filaments.

An extrusion head is also known (U.S. Pat. No. 3,307,216) which allows a body to be introduced into the bundle of filaments produced. A head of this type comprises a cylindrical body defining an annular chamber for distributing the pasty material above a perforated plate. The chamber is supplied with pasty material via an upper lateral feed duct. The body comprises a central cylindrical recess into which it is possible to introduce a component which is to be incorporated in the bundle of filaments which surround the latter after extrusion.

However, a head of this type is not without disadvantages either.

Irrespective of the path which the product takes between the introduction channel and the plate, this type of head does not allow for the presence of a pasty product of homogeneous viscosity at the plate perforated with holes through which the extruded filaments emerge, so creating differences in quality and durability in the filaments of extruded material produced.

SUMMARY OF THE INVENTION

The present invention aims to provide an extrusion head for producing yarns from a material which is heated to form a paste which meets the practical requirements better than those known hitherto, in particular in that it has a lateral pasty product supply, which in particular enables a central component to be introduced into the bundle of extruded filaments, whilst ensuring large-scale homogeneity in quality and durability in the extruded yarns produced, in a manner which is simple to perform and at low cost.

To this end, the present invention in particular proposes an extrusion head for producing yarns from a material which is heated to form a paste, of the type described above, characterized in that the distribution chamber, in the horizontal plane, has a section through which the pasty material passes downwards and which gradually decreases over at least part of the height of the chamber, in the direction towards the bottom of the feed duct, this decrease being provided so as to create over time substantially identical pressure and shearing stresses on the pasty material, between the lateral feed duct and the bottom of the chamber respectively irrespective of the path the said pasty material takes when it flows out of the lateral feed duct at the bottom of the said chamber.

In addition, in advantageous embodiments, various of the following arrangements are possible, either singly or in combination:

the chamber has a lower area in the form of a slot having a vertical section which decreases gradually in the direction away from the lateral feed duct;

if the gap between the walls in a given horizontal plane is designated by the term "clearance" (H), the lower slot-like area is annular and has cylindrical vertical lateral walls with a constant clearance (H) and a height (Y) which is measured relative to the horizontal plane delimiting the bottom of the lower part of the chamber (or relative to the plate, at an approximately constant height), decreasing gradually in the direction away from the lateral feed duct;

the lower slot-like area has cylindrical vertical lateral walls with a gap (H) and a height (Y) relative to the plane delimiting the bottom of the chamber, both of which decrease gradually in the direction away from the lateral feed duct;

the chamber comprises an upper area in the form of a chute of which the cross-section (s) decreases gradually in the direction away from the inlet aperture of the lateral feed duct, which leads into the said chamber;

the head further comprises an annular extrusion chamber having a constant cross-section which, for example, widens conically downwards (in the form of an inverted trapezoid), located above the extrusion plate, in the extension of the distribution chamber;

if R (1) designates the hydraulic radius of the chute, if necessary defined by the equivalent hydraulic diameter of a section of the chute by the formula:

$$D_3 = 4 \cdot \text{surface area/perimeter},$$

the hydraulic radius [R(1)] of the chute and the height [Y(1)] of the slot measured at a distance l from the axis of the lateral feed duct, along the axis of the chute, are determined by the following formulae:

$$R(l) = R_0 (1/L)^{\frac{1}{3}}$$

$$Y(l) = Y_0 (1/L)^{\frac{2}{3}}$$

in which:

$R_0$: hydraulic radius of the chute at right angles to the axis of the feed duct;

L: length of the slot measured from the axis of the feed duct;

$Y_0$: maximum height of the slot at right angles to the axis of the feed duct;

$R_0 = K \cdot (H^2 \cdot L)^{\frac{1}{3}}$ and $Y_0 = K' \cdot (H^2 \cdot L)^{\frac{1}{3}}$, K and K' being constants;

K is substantially 0.607 and K' 2.3398;

the extrusion head comprises two distribution chamber sections which are symmetrical relative to the vertical plane passing through the feed duct axis;

the cross-section of the chute in the upper area is circular, semi-circular, square or rectangular;

the horizontal section of the lower area of the distribution chamber is O-, C- or U-shaped, the ends of the branches of the C or U being spaced apart to a greater or lesser extent;

the head has a plurality of identical bodies each supplied via a respective lateral feed duct located at the top of the said bodies;

the bodies are distributed about a central recess or hollow core;

the head comprises a cylindrical hollow punch which passes through it from one side to the other, the chamber wrapping around the said punch;

the lower area of the chamber opens into an annular extrusion chamber provided at the bottom, above the plate perforated with extrusion apertures, with an additional homogenizing grid consisting, for example, of a perforated annular plate which is used to improve the homogeneity of the velocities of the pasty material before it is extruded through the said plate;

the head comprises cartridge-type heating means (cylindrical heating element placed in the and/or around the head body) which may or may not be removable and may or may not enable a plurality of independent areas, which may be separately controlled, to be defined;

the head comprises means which heat by heat-transfer fluid or by a cylindrical electrical resistor.

The invention also relates to an extrusion head for producing yarns from molten synthetic material comprising at least one body defining a chamber for distributing the molten synthetic material above a horizontal plate perforated with extrusion apertures, the said chamber being supplied with synthetic material via at least one upper lateral feed duct, characterized in that the chamber comprises:

an upper area in the form of a chute of which the cross-section (s) decreases gradually in the direction away from the inlet aperture of the lateral feed duct which leads into the said chamber; and an annular lower area having cylindrical, vertical lateral walls with a constant clearance (H) and a height (y), relative to the plate, which decreases gradually in the direction away from the said inlet aperture.

Advantageously the chamber is symmetrical relative to the median vertical plane of the feed duct. The invention will be better understood from the following description of particular embodiments given by way of non-limiting example.

BRIEF DESCRIPTION OF THE DRAWINGS

The description relates to the attached drawings, in which.

DETAILED DESCRIPTION OF THE INVENTION

Figure 1:
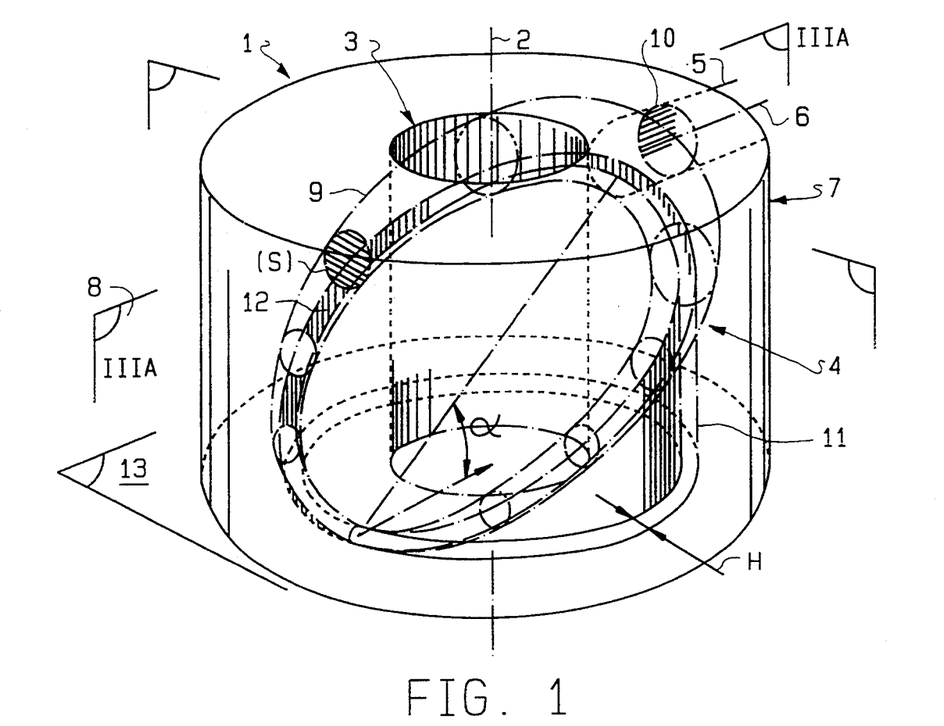
FIG. 1 is a perspective view of a body with an extrusion head distribution chamber according to one embodiment.

FIG. 1 shows an extrusion head or body member 1 comprising a distribution chamber according to the particular embodiment of the invention described in this case.

The body 1, for example made of stainless steel or more generally of a heat-conductive material, is a cylindrical with a vertical axis 2 pierced from one lateral to the other by a central cylindrical hollow punch 3 having the same vertical axis.

The body is moulded and defines a distribution chamber 4 which can receive the molten synthetic material, for example nylon or polyethylene. The chamber is formed by a recess provided in the body when it is moulded.

A lateral tube 5 for supplying synthetic material and extending about an axis 6 perpendicular to the vertical axis 2 of the body 1 over at least a terminal section connecting with the body is provided at the top 7 of the body. The chamber is symmetrical relative to the vertical plane 8 passing through the axis 6 of the said tube, and wraps around the hollow punch 3.

The distribution chamber 4 comprises an upper area 9 or chute of which the cross-section (s) is circular and decreases gradually in the direction away from the inlet 10 of the lateral feed duct 5 which leads into the chamber. The chute is thus generally crescent-shaped, the cusps of the crescent closing up on themselves about a transverse plane of symmetry inclined relative to the horizontal plane by an angle α. Furthermore, the distribution chamber 4 has an annular cylindrical lower area or section 11 having the same vertical axis 2 as the body and a width or clearance H in the constant horizontal plane and a height (y), measured between the base 12 of the chute 9 and the lower horizontal plane 13 delimiting the bottom or lower part of the distribution chamber, which decreases gradually in the direction away from the inlet aperture 10 of the tube 5 in the chamber.

Figure 2:
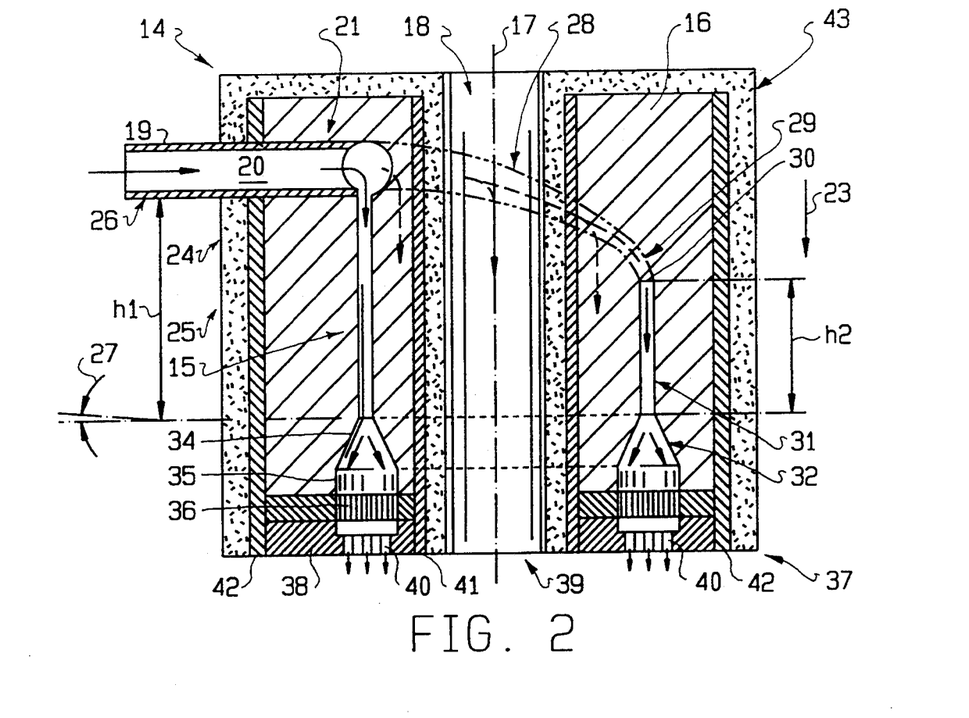
FIG. 2 is a view in vertical section of an extrusion head according to the embodiment of the invention described in more detail in this case, provided with a distribution chamber of the type as shown in FIG. 1 and comprising an extrusion chamber and a distribution grid, above the extrusion grid.

FIG. 2 shows in vertical section an extrusion head 14 according to an embodiment of the invention having a distribution chamber 15 of the type shown in FIG. 1.

The head 14 comprises a cylindrical body 16, known as the die plate body member, about a vertical axis 17, comprising a recess or hollow cylindrical central punch 18 with the same axis 17.

The chamber is supplied laterally with pasty synthetic material via a cylindrical pipe 19 with a horizontal axis 20 at the point where the pipe enters the chamber at the top of the body 16.

The distribution chamber 15 has a section for the downwards passage of the pasty material (in the direction of the arrow 23) in the horizontal plane which decreases gradually in the downwards direction over at least a part 24 of the section of the chamber 25 located between the horizontal plane 26 passing through the lower generating line of the inlet aperture 21 and the lower horizontal plane 27 delimiting the bottom of the distribution chamber or lower part.

More precisely, as shown in FIG. 2, the distribution chamber comprises an upper crescent-shaped chute 28 of which the cusps 29 join at 30 symmetrically relative to the axis of the head 17, opposite the inlet aperture 21, and a lower annular area or section 31 with cylindrical walls, likewise with an axis 17, and having a height (y) which decreases gradually in the direction away from the said inlet aperture 21, between two values designated $h_1$ and $h_2$ in FIG. 2, $h_1$ being the height between the horizontal planes 26 and 27 and $h_2$ being the height of the lower point of the chute at 30, still relative to the plane 27. It should be noted that the value of $h_2$ is 0 in FIG. 1. Similarly, it should be noted that the height of the section 24 is equal to $h_1 - h_2$.

The lower area 31 extends the upper chute 28 directly in a vertical direction, the median vertical cylinder of this lower area 31, equidistant from the walls of the said area, comprising the lower generating line of the chute 28.

The lower area 31 of the head 15 opens out at the bottom onto an annular extrusion chamber 32 having a vertical axis 17 and a constant vertical, trapezoidal or isosceles section, which widens downwards at the top 34 thereof and is rectangular at the bottom 35.

The head further comprises an annular distribution grid 36, known per se, located below the bottom 35 of the extrusion chamber 32.

This grid is perforated and can in certain cases enable the homogenizing of the speeds and pressures to which the pasty material is subjected as it passes into the head around the punch 18 to be further improved such that the viscosity of the pasty material is thoroughly homogeneous.

Depending on the polymer extruded and its degree of purity, a filtration system (not illustrated) might also be used.

For example, the bottom 35 of the extrusion chamber could further comprise one or more annular metal filter screens of suitable aperture.

Or, if necessary, a filtration system known per se could be used, comprising porous filter cartridges or a bed of granular material, for example.

Finally, the head 14 comprises at the bottom 37 an annular spinning plate 38 which is perforated at the center 39 thereof by a cylindrical hole having the same diameter as the hole in the punch 18 and perforated with fiber-extrusion holes 40 regularly distributed over the surface thereof and having a graded diameter.

In the embodiment described above, the cylindrical body 16 is made of heat-conductive material. Electrical resistors 41 and 42 internally and externally of the body 16 respectively for heating and/or maintaining the temperature of the said body by conduction and/or radiation are provided. They consist for example of cylindrical coils by heating resistance wires which are supplied with electricity and cooperate contiguously with the internal and external faces of the cylindrical body of the head.

A further provision can be the control of the temperature of the body and thus of the material which it contains and is being extruded. The temperature is regulated by means which heat electrically the resistors controlled by means of thermoelectric couples (not illustrated) secured in a regular manner on the body 16 for example.

A heat-insulated protective hood 43 covers the body and the resistors over their entire outer surface with the exception of the lower face from which the extruded filaments emerge.

It will be appreciated that other means for heating the body can also be provided, for example by circulating a heat-transfer fluid inside and/or in contact with the exterior of the body 16.

In other embodiments the body is made of material which is not heat-conductive. No means for heating the pasty material is therefore provided on the head, since the pasty material only remains inside the said extrusion head for a limited amount of time and does not vary the temperature thereof in an obtrusive manner or to a significant degree.

At the top, FIGS. 3A to 3D show in vertical section the body of FIG. 1. When appropriate the same reference numbers as those used in FIG. 1 have therefore been used in these Figures. The distribution chamber 4 therein is extended by an annular extrusion chamber 44 having a constant trapezoidal cross-section which widens at the bottom and of which the upper base 45 has a width H equal to that of the vertical slot of the lower area 11 of the distribution chamber 4.

Figure 3A:
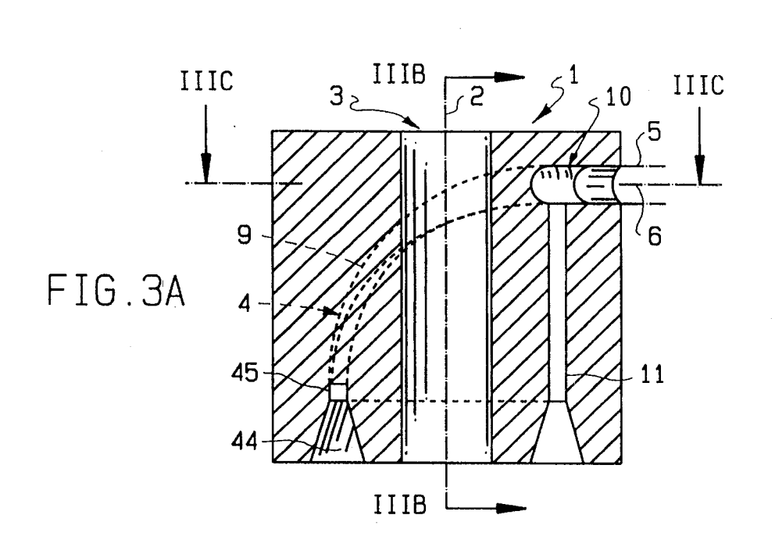
FIG. 3A is a view in vertical section along the line IIIA—IIIA in FIG. 1, showing in addition an extrusion chamber in the extension towards the bottom of the distribution chamber.
Figure 3B:
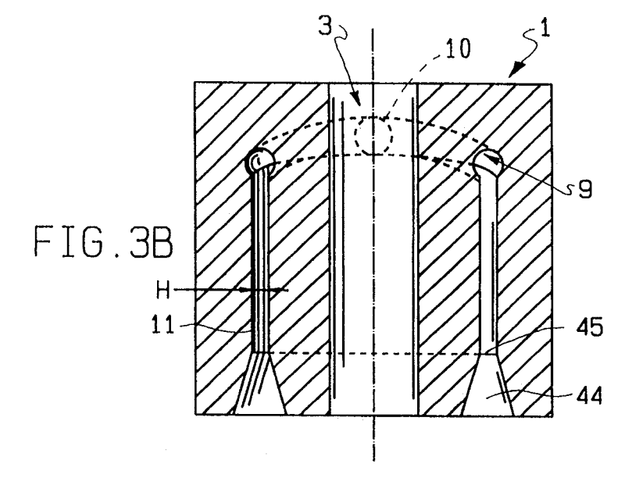
FIG. 3B is a view in section along the lie IIIB—IIIB in FIG. 3A.
Figure 3C:
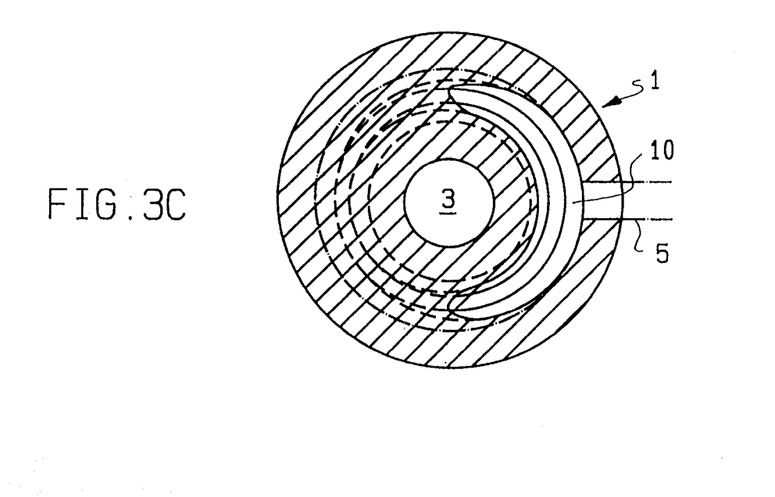
FIG. 3C is a view in section along the line IIIC—IIIC in FIG. 3A.
Figure 3D:
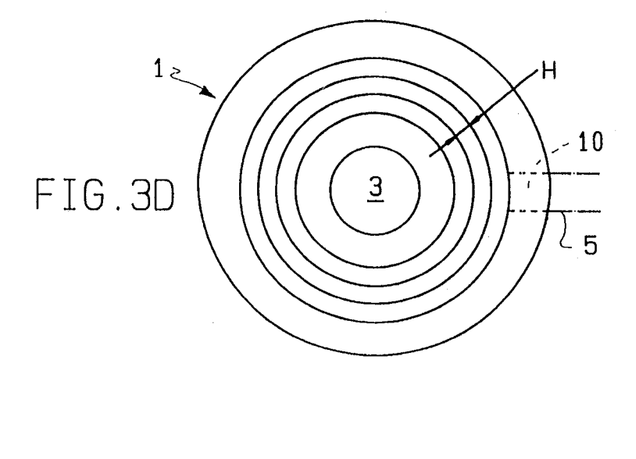
FIG. 3D is a bottom view of FIG. 3A.

In this embodiment, the inlet aperture 10 is within the projection in the vertical plane of the chute 9 (cf. FIG. 3B).

The calculation of the dimensions of the distribution chamber according to the invention will now be explained in greater detail.

As generally defined, the distribution chamber according to the invention has a section for the downwards passage of the pasty material in the horizontal plane which decreases gradually in the direction away from the lower horizontal plane tangential to the lateral feed duct perpendicular to the head, this decrease being provided so as to create over time substantially identical pressure and shear stresses on the pasty material, irrespective of the path taken by the said pasty material when it flows out of the lateral feed duct at the bottom of the chamber.

The calculation of the shapes of the chute and of the slot in the embodiment of the invention described here in particular, like that of any other shape meeting the above criterion, follows directly from the calculation of the shape of the known type of annular die plate having a wide slot.

It is thus within the scope of the person skilled in the art who will also take the following assumptions into account:
 the incompressibility of the fluid;
 the isothermic nature of the fluid (it is accepted that there is no viscous dissipation or heat transfer by conduction);
 no interaction in the fluid between the duct and the slot.

The conditions with limits set down by the above definition are expressed in that the isobars in the fluid pasty material when it descends downwards are parallel to the slot at the outlet of the distribution chamber.

Furthermore the inventors hypothesized that it was appropriate to use so-called "representative" viscosities known to the person skilled in the art.

For laminar and isothermic pressure flow rates there is a location in the flow duct where the shear velocities encountered for a product of a pseudo-plastic nature have a profile identical to that of a Newtonian product. "Representative" viscosities of a product of a pseudo-plastic nature can thus be represented simply from poise flows which are tubular, planar, etc.

For this purpose reference is made to the following table:

| GEOMETRY | PSEUDO-PLASTIC STRUCTURE REPRESENTATIVE VALUE |
|---|---|
| circle | $\dot{\gamma} = \frac{4Q}{R^3} \cdot e_0 \quad e = 0.815$ |
| rectangular slot | $\dot{\gamma} = \frac{6Q}{BH^2} \cdot e_\square \quad e = 0.772$ |
| annular slot | $\dot{\gamma} = \frac{Q}{(Re^2 - Ri^2)R} = \frac{V}{R}$ |

The meanings of the parameters used in this table are as follows:
 $\dot{\gamma}$ : viscosity
 Q: flow rate of the pseudo-plastic material passing through the shape in question with:
  in the case of a cylindrical slot
  R: radius of the circle
  $e_0$: shape factor connected with the viscosity of the product
  in the case of a rectangular slot
  B: length of the rectangle
  H: width of the rectangle
  e : shape factor connected with the viscosity of the product
 : *in the case of an annular slot
  $R_e$: external radius of the ring
  $R_i$: internal radius of the ring
  H: width of the ring (H = $R_e - R_i$)

As an example, a calculation will now be made within the scope of the embodiment described more particularly in this case, using the reference numbers from FIGS. 4, 5 and 6.

For reasons of symmetry, the chute and the slot are calculated for half of the distribution chamber.

The following parameters are used:
$Q_0$: flow rate over half the distribution chamber
H: constant clearance of the slot 50 forming the lower area
$Y_0$: maximum height of the slot, $Y_0 = Y(L)$
L: length of the outlet slot in the horizontal outlet plane 51 (over half the chamber)
l: step of variation over the length L
$R_0$: initial radius of the chute 52
dP: pressure drop
$\gamma g$: representative shearing rate in chute 52
$\gamma f$: representative shearing rate in slot 50
$\eta g$: representative viscosity in the chute
$\eta f$: representative viscosity in the slot
v: average velocity of the pasty material
$\theta$: angle of revolution of the shape about the axis 53 of the hollow cylindrical punch
$\bar{\phi}$ : angle between the circumference of the chute and the horizontal plane at the slot (tan$\bar{\phi}$ = dy/dl).

The following calculations should then be made:
With respect to the section of the chute, assuming that the shearing stress at the wall is not a function of l, it is sufficient to write down that the shearing rate is then constant, i.e.:

$$\gamma_g = \frac{4 \cdot Q_o}{\pi \cdot R^3(1)} = \text{constant} \quad (1)$$

It then follows that:

$$R(1) = R_0 \cdot (1/L)^{\frac{1}{3}} \quad (2)$$

With respect to the calculation of the shape of the slot (lower area of the distribution chamber), the procedure is as follows:

Assuming that the output velocity of the pasty material is identical over the entire width of the distribution chamber, the volume flow rate in the chute should decrease in a linear manner, it follows that:

$$Q(l) = Q_0 l/L \quad (3)$$

For the chute, the average velocity is:

$$V_g = \frac{Q_o \cdot 1}{\pi \cdot R^2(1)L} \quad (4)$$

from which $$dP_g = \frac{8 \cdot Q_o}{\pi \cdot L} \int_1^L \frac{1 \cdot \eta_g(l)}{R^4(l)} \quad (5)$$

As regards the slot, the average velocity is calculated by the formula:

$$V_f = \frac{Q_o}{L \cdot H} \quad (6)$$

from which $$dP_f = \frac{12 \, \eta_f(l)}{H^2} \cdot y(l) \quad (7)$$

This gives a total pressure drop of:

$$dP_g + dP_f = \frac{8 \cdot Q_o}{\pi L} \int_1^L \frac{1 \cdot \eta_g(1)}{R^4(1)} \cdot dl + \frac{12\, \eta_f(1)}{H^2} \cdot y(1) \quad (8)$$

By adopting the hypothesis according to the invention, i.e. isobars parallel to the slot, at the outlet of the latter, it follows that:

$$\frac{\delta P}{\delta l} = 0 \quad (9)$$

For the chute, if there is the same shearing rate for each displacement, it follows that:

$$\eta g = f(1) \quad (10)$$

As for the slot, H=constant:

$$\eta f = f(1) \quad (11)$$

and it follows that:

$$\frac{dy}{dl} = \frac{\eta_g}{\eta_f} \cdot \frac{2 \cdot H^3 \cdot 1}{3\pi \cdot R^4(1)} \quad (12)$$

in which $$R(1) = R_0 \cdot (1/L)^{\frac{1}{3}} \quad (2)$$

which gives $$\frac{dy}{dl} = \frac{\eta_g}{\eta_f} \cdot \frac{2 \cdot H^3 \cdot 1}{3 \cdot \pi \cdot R_o^4 \cdot (1/L)^{4/3}} \quad (13)$$

or, after incorporation $$y(1) = \frac{\eta_g}{\eta_f} \cdot \frac{H^3 \cdot L^{4/3} \cdot 1^{2/3}}{\pi \cdot R_o^4} \quad (14)$$

in which $$Y(L) = Y_o \cdot \frac{\eta_g}{\eta_f} \cdot \frac{H^3 \cdot L^2}{\pi \cdot R_o^4} \quad (15)$$

hence $$Y(1) = Y_o \cdot (1/L)^{2/3} \quad (16)$$

In this particular case $Y_0$ is connected with the representative viscosities of the product.

$$\eta_g = f(g) = f\left(\frac{1.038\, Q_o}{R_o^3}\right) \quad (17)$$

$$\eta_f = f(f) = f\left(\frac{4.631\, Q_o}{H^3 L}\right) \quad (18)$$

The two parameters $R_0$ and H are freely selected.

In the embodiment described in particular in this case, based on the hypothesis that the product is subject to the same shearing stress irrespective of the path taken, i.e.

$$\gamma_g(1) = \gamma_f(1) \text{ and}(\eta_g = \eta_f) \quad (20)$$

$$\frac{4\, Q_o}{\pi R^3(1) L} \cdot e_o = \frac{6\, Q_o}{L H^2}$$

in which $e_0 = 0.815$ and $e = 0.772$ it follows that $$R(1) = 0.0607 \cdot (H^2 \cdot 1)^{\frac{1}{3}} \quad (21)$$

$$R_0 = R(L) = 0.0607 \cdot (H^2 \cdot L)^{\frac{1}{3}} \quad (22)$$

and $$Y_0 = 2.3398 \cdot (H^2 \cdot L)^{\frac{1}{3}} \quad (23)$$

The shape of the distribution chamber is thus completely independent and universal.

Figure 4:
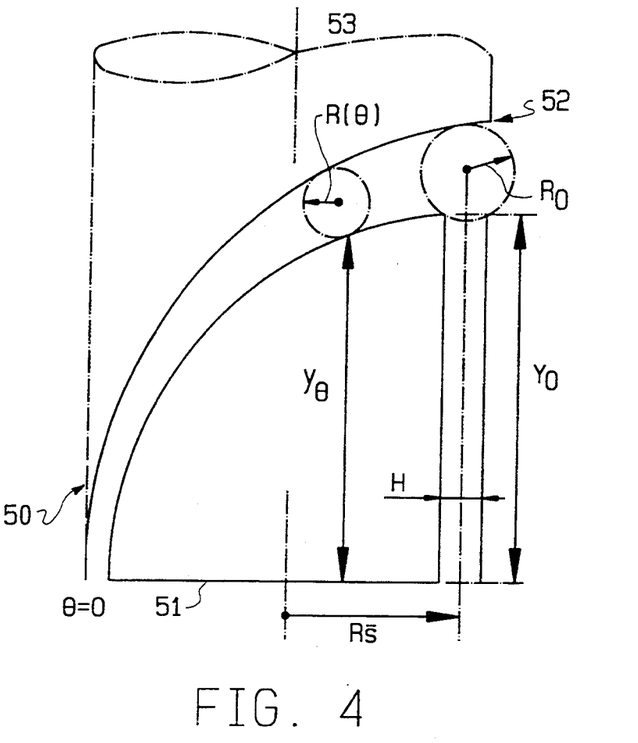
FIG. 4 is a schematic lateral view of the distribution chamber in FIG. 1 and FIGS. 3A to 3D, indicating the parameters for calculating the various sections of the distribution chamber according to this particular embodiment of the invention.
Figure 5:
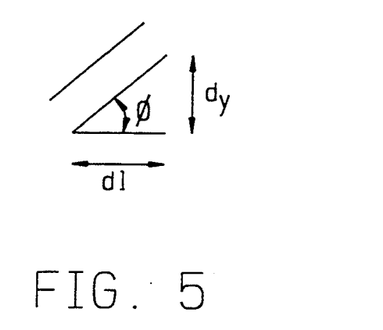
FIG. 5 indicates the definition of one of the parameters for calculating the dimensions of the chamber shown in FIG. 4.
Figure 6:
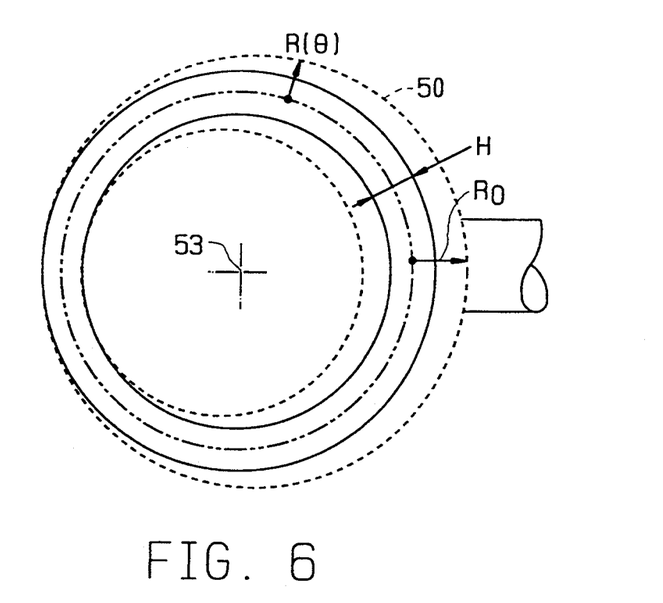
FIG. 6 is a bottom view of FIG. 4.

In the case of an annular die plate, as shown in FIGS. 4, 5 and 6, L merely has to be replaced by $\pi r$ and 1 by $\theta \cdot r$ which gives:

$$Y(\theta) = Y_0 \cdot (\theta/\pi)^{\frac{2}{3}} \quad (24)$$

$$R(\theta) = R_0 \cdot (\theta/\pi)^{\frac{1}{3}} \quad (25)$$

Figure 7A:
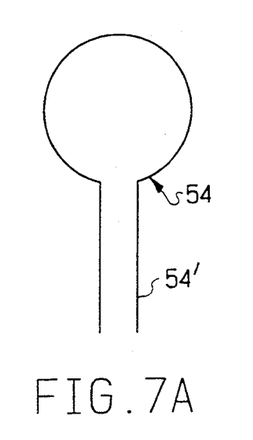
FIGS. 7A, 7B, 7C, 7D, and 7E are vertical cross-section profiles of upper and lower sections of the distribution chamber according to embodiments of the invention.

The above equations are valid if the cross-section of the chute 54 is circular, with slot 54' having a constant gap, as shown in FIG. 7A.

However, it is quite possible to envisage (FIG. 7B) the chute 55 having a semi-circular cross-section, a wall of the slot 55' extended vertically upwards forming a lateral face 55'' and the other 55''' being rounded, in a semi-circle.

Figure 7B:
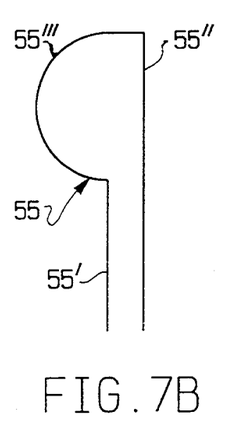
Figure 7C:
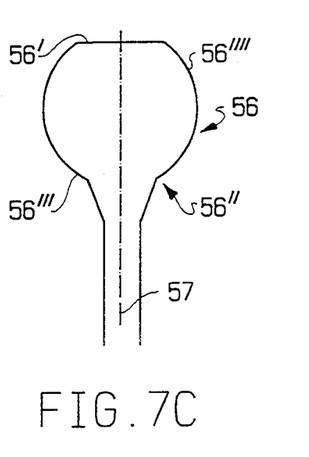

FIG. 7C shows a chute 56 in the shape of a droplet, i.e. having a circular cross-section truncated horizontally at the top 56' and having a trapezoidal bottom section 56'' which widens at the bottom, the small base of the trapezoid having the width of the gap (H) which extends the latter downwards, and the two lateral faces 56''' and 56'''' of the chute being symmetrical relative to a median vertical plane 56 and arcuate, for example.

Figure 7D:
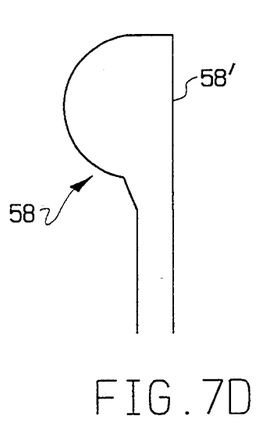

The chute 58 (FIG. 7D) can also be in the shape of a semi-droplet with one face 58' extending the slot as in the case of FIG. 7B.

Figure 7E:
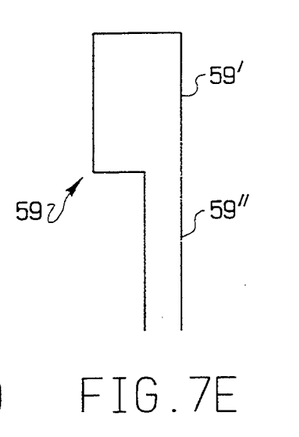

A cross-section of the chute 59, which is square or rectangular, (FIG. 7E), with (or without) a lateral face 59' in the same plane as the walls of the slot 59'' is also possible, etc..

For these different shapes, it is then sufficient to define an equivalent hydraulic diameter: $D_E = 4S/P$, thus an equivalent radius $R_E$, in which:

S = the surface area of the cross-section of the chute
P = the perimeter of the cross-section of the chute.

The chute can be calculated using the principle (2).

Assuming that the surface areas are equivalent, the geometric parameters of these shapes can also be calculated as a function of R(1).

Thus the combined decrease, relative to the horizontal die plate, of the cross-section of the distribution chute and the height of the slot, ensure that the material is distributed in a thoroughly homogeneous manner in this area owing to the observance of the conditions of pressure drop, compression time and shear velocity respectively such that they are substantially identical irrespective of the flow paths taken by the material.

Figure 8A:
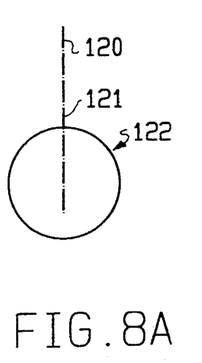
FIGS. 8A, 8B, 8C and 8D are schematic illustrations in plan view of embodiments of distribution chambers, according to the invention, which are symmetrical relative to the vertical plane passing through the feed duct axis.
Figure 8B:
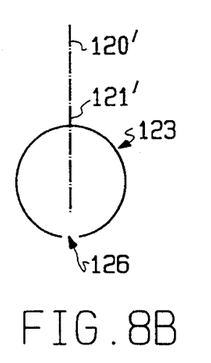
Figure 8C:
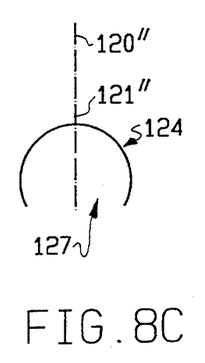
Figure 8D:
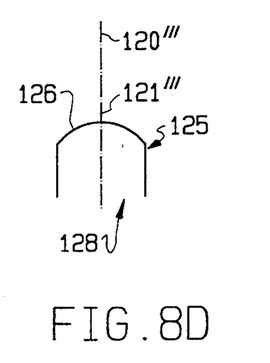

FIGS. 8A, 8B, 8C and 8D show schematically some examples of a distribution chamber according to embodiments of the invention which, being symmetrical relative to the vertical plane (120, 120', 120'', 120''')

passing through axis of the feed duct (121, 121', 121", 121''') can thus have a generally cylindrical shape 122 as described above (FIG. 8A), in sections of a circle 123, 124 which are not closed (FIGS. 8B and 8C), or U-shaped 125, of which the base 126 is rounded to a greater or lesser extent (FIG. 8D).

Owing to the original shape proposed by the invention, which has a feed duct perpendicular to the spinning head and a distribution area relative to this duct, the spinning extrusion head can assume shapes of this type.

The lateral openings 126, 127, 128 respectively provided in the case of the embodiments, which are open to a greater or lesser extent, corresponding to FIGS. 8B, 8C and 8D, further enable fibers or threads to be introduced laterally into the hollow punch in the head.

Figure 9A:
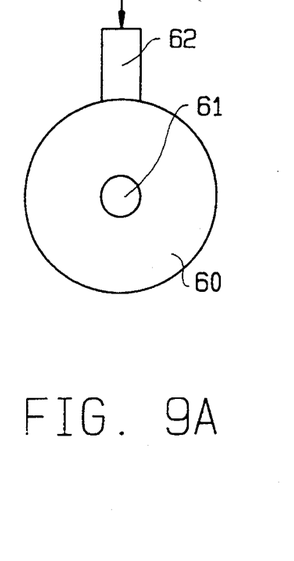
FIGS. 9A, 9B and 9C are plan views of extrusion heads according to the particular embodiments of the invention, which are circular or in the form of one or a plurality of circle sections.
Figure 9B:
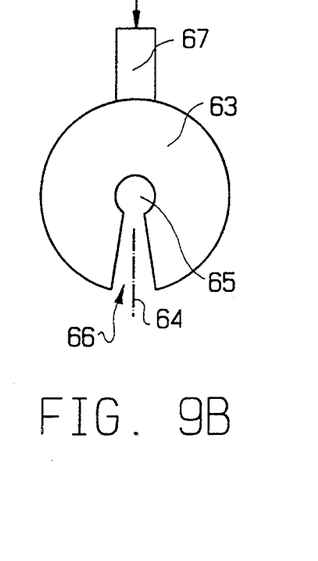
Figure 9C:
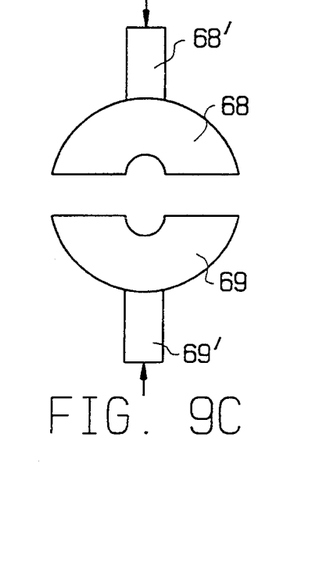

With reference to FIGS. 9A to 9C it can also be seen that the extrusion head according to the invention can have a cylindrical body member 60 with a hollow punch 61 and lateral feed 62.

The body member (FIG. 9B) can also be a section of a cylinder 63 which is symmetrical relative to the vertical plane 64 passing through the axis of the duct 67, with a central punch 65 and a lateral slot 66 in the shape of a cylindrical ring section, for example with radial walls, located opposite the lateral duct 67 relative to the axis of the head.

Likewise, the extrusion head according to the invention can be produced in two body members or parts 68, 69, for example, which are semi-annular or in the form of a cylindrical (FIG. 9C) or oval ring section and which can be identical, for example. The polymer enters laterally via the opposite pipes 68' and 69' respectively.

The two semi-annular sections are disposed opposite one another but are not in contact. Apart from the fact that it facilitates the passage of the fibers or threads in the extrusion head, this arrangement creates empty spaces in the sheet of filaments produced enabling other products to be introduced into the assembly.

Figure 10A:
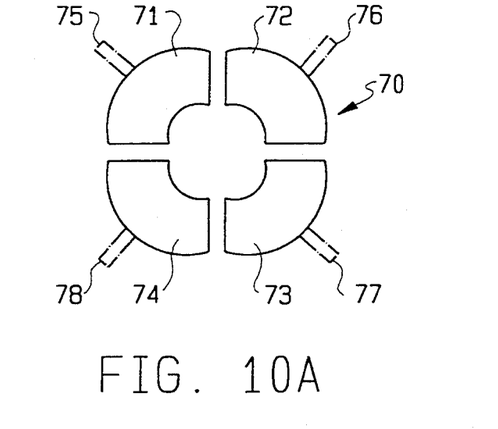
FIGS. 10A, 10B and 10C are further embodiments, in plan view, of extrusion heads according to the invention, comprising a plurality of bodies.
Figure 10B:
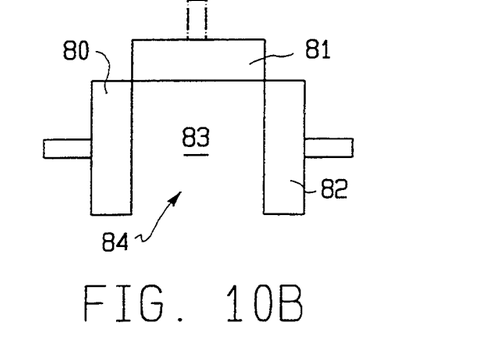
Figure 10C:
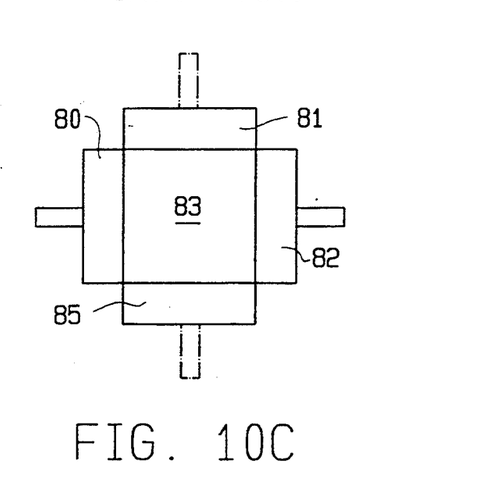

FIGS. 10A, 10B and 10C are further embodiments of the extrusion head according to the invention.

FIG. 10A shows an extrusion head 70 having four body members with a cross-section in the form of a quarter of a cylindrical ring 71, 72, 73, 74 which are identical and fed by a feed duct or pipe 75, 76, 77, 78 respectively. The chambers inside these bodies are of the type having a chute and extension slot at the bottom of the chamber with a constant clearance, for example.

FIG. 10B shows a head having three identical body members in the form of rectangular die plate bodies 80, 81, 82 disposed adjacent and at right angles to one other and leaving a square central space 83 which is open at its side 84.

Figures 11, 12:
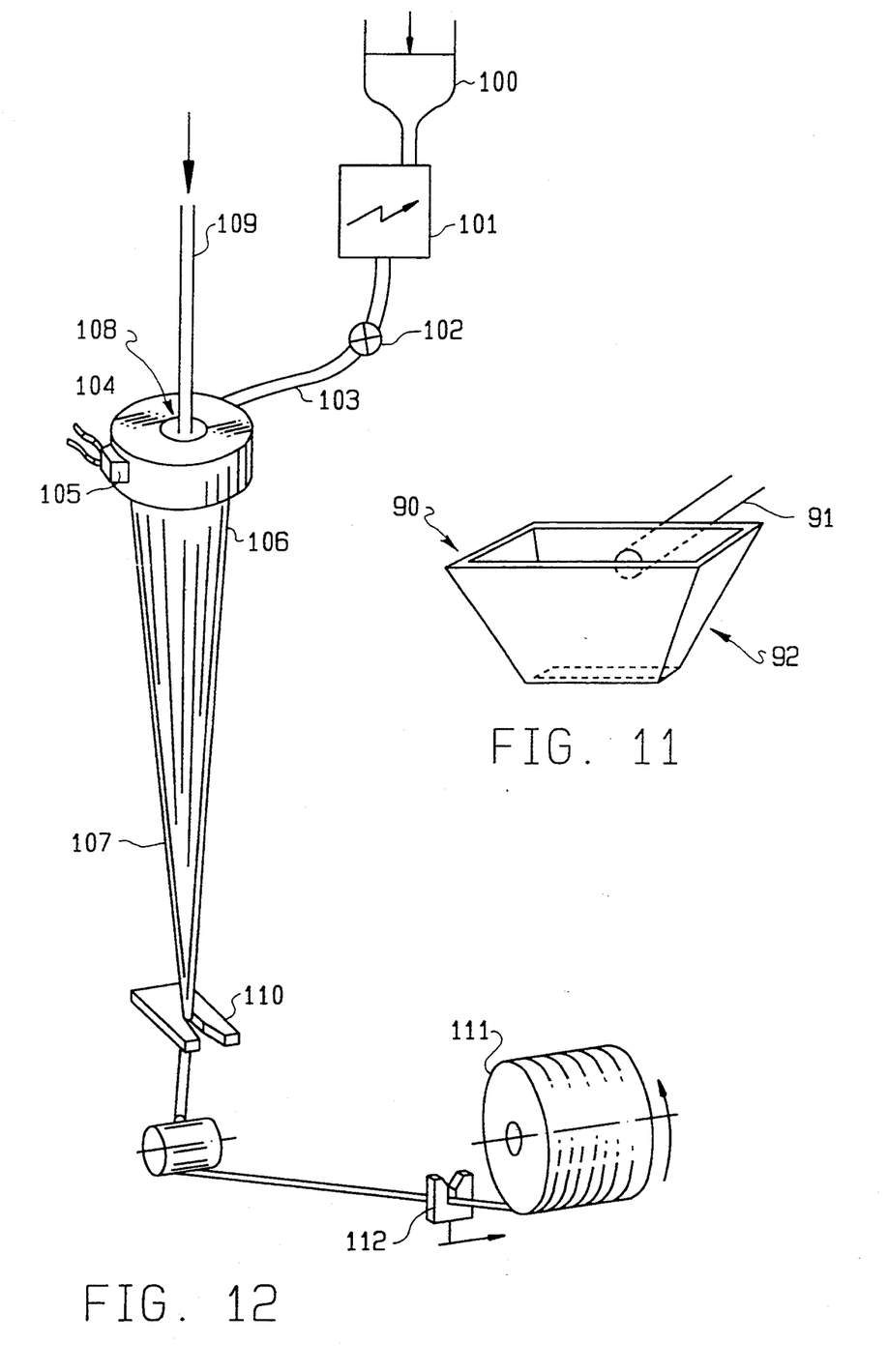
FIG. 11 is a perspective view of the distribution chamber of a head according to a further embodiment of the invention.
FIG. 12 is a schematic diagram of a device using an extrusion head according to the embodiment of the invention described in particular in this case.

FIG. 10C shows four identical rectangular die plate bodies, for example having a chamber of the type described in FIG. 11, one body member 85 being disposed along the side 84 of the square 83.

The embodiment described more particularly in this case is in no way limiting, as has been understood, and any other embodiment of the chamber, for example a chamber of the type shown in FIG. 11, fulfilling the above criteria can be suitable.

FIG. 11 shows a chamber 90 which is supplied via a lateral pipe 91 at the top 92 of the said chamber. The latter has a rectangular section for the passage of the pasty material introduced at 92, but it can equally well be trapezoidal, for example, and it decreases gradually in the direction away from the horizontal plane passing through the lower generating line of the feed pipe.

With reference to FIG. 12 a method of using the extrusion head according to the invention more particularly described in this case, applied in a non-restrictive manner in the manufacture of extruded synthetic material filaments, will now be described.

The synthetic material, for example a thermoplastic polymer, e.g. a polyamide, is stored in the form of granules in a hopper 100 which feeds a vertical melting furnace 101. The polymer is melted in this furnace and is then transported in the molten and pressurized state by a metering pump 102, for example a gear pump of which the role is to ensure that the molten polymer is fed into the duct at a pressure and delivery rate which are perfectly uniform.

It is perfectly possible to install upstream of this feed duct a static mixer for example of which the function would be to improve further the homogenizing of the temperature and velocity of the molten polymer.

The metering pump feeds the duct 103 which opens onto the extrusion head 104 in a chamber fulfilling the conditions of the invention.

This head is heated for example by means 105 known per se which can be electrical, for example.

At the pressure exerted, the polymer flows homogeneously into the internal chamber up to the lower extrusion plate where the polymer over the entire periphery of the head is of homogeneous viscosity.

The polymer then flows from the apertures in the spinning plate in the form of fluid jets 106 which are mechanically drawn then cooled in the form of a plurality of continuous filaments 107.

The annular extrusion head is provided with a central passage 108, through which a linear material, for example a continuous glass yarn 109, is projected.

By extrusion then mechanical drawing after the head 104, a conical sheet is formed of which the tip faces downwards and which is guided towards a collection device provided with a notch 110, for example, which causes the yarn and the sheet to join physically and produces a single composite bundle. The bundle is then wound, for example, directly onto a rotating support 111 on which it is distributed in a manner known per se by a notched plate 112 moved in a reciprocating manner illustrated schematically by the double arrow in FIG. 12.

One of the embodiments described above will be taken as an example. This is an extrusion head of the type illustrated by FIGS. 3A to 3D, 4, 5 and 6.

This head has the following features:
diameter of feed duct (19): 20 mm
initial diameter of cylindrical: 20 mm chute ($2R_O$)
external radius of slot ($R_e$): 88.5 mm
internal radius of slot ($R_i$): 84.5 mm
constant clearance of slot (H): 4 mm
maximum height of slot ($Y_0$): 157.5 mm The variations in the diameter of the chute and the height of the slot are obtained by equations (24) and (25).

temperature of head body: 250° C.
head delivery rate: 20 kg/h

The material with which the head is supplied is a homopolymer polypropylene of which the flow figure is 20 dg/min., measured according to ISO standard 1133.

The shearing rate of this material in the chute $\gamma_g$ can vary about 3.5. The shearing rate thereof in the slot $\gamma_f$ likewise varies about 3.8.

None of the areas in the head is supplied with an excess of or too little material. It is noted in particular that the temperature of the polymer in a horizontal plane passing through the base of the slot varies very little. This variation is of the order of 1° C. between the central core (approximately 240° C.) and the outer and inner edges of the slot (approximately 241° C.). The plate with which the base of the head is provided is perforated with 768 apertures disposed over 8 concentric circles. The diameter of these orifices is 550 μm and their height/diameter ratio is 4.

The filaments obtained have a highly uniform diameter in the region of 25 μm.

As is self-evident and also results from the above, the present invention is not restricted to the embodiments described in particular.

We claim:

1. Extrusion head (14, 70, 104) for producing continuous filaments of uniform diameter from a material which has been heated to form a paste, comprising at least one body member (1, 16, 60, 63, 68, 69, 71, 72, 73, 74, 80, 81, 82, 85) defining a vertically oriented distribution chamber (4, 15), having a vertical height, for distributing pasty material above a plate (38) perforated with a plurality of rows of spaced extrusion apertures (40), said chamber being supplied with said pasty material via at least one upper lateral feed duct (5, 19, 62, 67, 68', 75, 76, 77, 78, 103), extending about an axis (6, 20) with a terminal part thereof defining an inlet aperture (10, 21) connecting with said chamber, characterized in that said distribution chamber (4, 15) has a cross-section through which said pasty material passes downwards and away from said lateral feed duct (5, 19) to define a direction of flow for said pasty material, which cross-section, over at least part (24) of said height of the chamber, gradually decreases at increasing distances (1) from said lateral feed duct (5, 19), as measured in a direction along said direction of flow of said pasty material, said distribution chamber having upper and lower sections, and decreasing in size in accordance with the following formulae:

$$R(l) = R_0 (1/L)^{\frac{1}{3}}$$

$$Y(l) = Y_0 (1/L)^{\frac{2}{3}}$$

in which:
$R_0$ = radius of said upper section at right angles to the axis of said feed duct at said inlet aperture;
L = length of said lower section measured from the axis of said feed duct;
$Y_0$ = Maximum height (Y) of said lower section at right angles to the axis of said feed duct to create over time substantially identical pressure and shearing stresses on said pasty material between said lateral feed duct (5, 19) and said bottom (27) of the chamber, respectively, irrespective of the path said pasty material takes when it flows from said lateral feed duct and out of said bottom of said chamber.

2. Extrusion head according to claim 1, characterized in that said chamber has a lower section (11, 31, 50) with a clearance (H) in the form of a slot having a vertical height (Y) which decreases gradually in said direction away from said lateral feed duct (5, 19).

3. Extrusion head according to claim 2, characterized in that said slot has cylindrical vertical lateral walls with a constant clearance (H) and a height (Y), relative to the plane (13, 27, 51) delimiting said bottom (27) of said chamber (4, 15) which gradually decreases in said direction away from said lateral feed duct (5, 19).

4. Extrusion head according to claim 2, characterized in that said slot has cylindrical vertical lateral walls with a clearance (H) and a height (Y) relative to the plane delimiting said bottom of the chamber, both of which decrease gradually in said direction away from said lateral feed duct.

5. Extrusion head according to claim 2, characterized in that the chamber comprises an upper section (9, 28, 54, 55, 56, 58, 59) in the form of a chute of which the cross-section (s) decreases gradually in said direction away from said lateral feed duct.

6. Extrusion head for producing continuous filaments from molten synthetic material comprising at least one body member (1, 16, 60, 63, 68, 69, 71, 72, 73, 74, 80, 81, 82, 85) defining an annular distribution chamber for distributing the molten synthetic material above a horizontal plate (38) perforated with extrusion apertures (40), said chamber having a bottom (27) and being supplied with synthetic material via a lateral feed duct disposed on one side thereof and extending about an axis (6, 20) and having an inlet aperture, characterized in that the chamber comprises:

an annular upper section (9, 28, 54, 55, 56, 58, 59) in the form of a chute extending along a chute axis and having a cross-section (s) which, as measured along said chute axis, decreases gradually in a direction away from said inlet aperture (10, 21) of said lateral feed duct (5, 19, 62, 67, 68', 75, 76, 77, 78, 103) which leads into said chamber to a minimum cross-section on the diametrically opposite side of said chamber;

an annular lower section (11, 31, 50) disposed between said annular upper section and said extrusion apertures and in communication with said upper section and with said extrusion apertures (40) and having cylindrical vertical lateral walls with a constant clearance (H) and a height (Y) relative to the plane delimiting said bottom (27) of said chamber which decreases gradually in said direction away from said inlet aperture to a minimum cross-section on the diametrically opposite side of said chamber, said distribution chamber decreasing in size in accordance with the following formulae:

$$R(l) = R_0 (1/L)^{\frac{1}{3}}$$

$$Y(l) = Y_0 (1/L)^{\frac{2}{3}}$$

in which:
$R_0$ = radius of said chute at right angles to the axis of said feed duct at said inlet aperture;
L = length of said lower section measured from the axis of said feed duct;
$Y_0$ = Maximum height (Y) of said vertical lateral wall at right angles to the axis of said feed duct to create over time substantially identical pressure and shearing stresses on said pasty material between said lateral feed duct (5, 19) and said bottom (27) of the chamber, respectively, irrespective of the path said pasty material takes when it flows from said lateral feed duct and out of said bottom of said chamber.

7. Extrusion head according to claims 5 or 6, characterized in that said chute (54, 55) has one of a circular and semi-circular cross-section.

8. Extrusion head according to claims 5 or 6, characterized in that said chute (59) has one of a square and rectangular cross-section.

9. Extrusion head according to claims 5 or 6, characterized in that said chute (56, 58) has a cross-section in the form of one of a droplet and semi-droplet.

10. Extrusion head according to claims 1 or 6, characterized in that:

$R_0 = K \cdot (H^2, L)^{\frac{1}{3}}$; and $Y_0 = K' \cdot (H^2, L)^{\frac{1}{3}}$, and $K$ and $K'$ being constants.

11. Extrusion head according to claim 10, characterized in that K is substantially 0.607 and K' is substantially 2.3398.

12. Extrusion head according to claims 1 or 6, characterized in that said distribution chamber includes two sections which are symmetrical relative to a vertical plane (8) passing through said axis of said feed duct.

13. Extrusion head according to claim 12, characterized in that said sections have a horizontal section, at said bottom of said chamber, of O-shaped configuration.

14. Extrusion head according to claim 12, characterized in that said sections have a horizontal section, at said bottom of said chamber, of one of a C and U-shaped configuration.

15. Extrusion head according to claims 1 or 6, characterized in that said distribution chamber comprises a plurality of identical body members (68, 69, 71, 72, 73, 74; 80, 81, 82, 85), each supplied via a lateral feed duct at the top thereof.

16. Extrusion head according to claim 14, characterized in that said body members are disposed about a central recess.

17. Extrusion head (14) according to claims 1 or 6, characterized in that said distribution chamber includes a central hollow cylindrical punch (3, 18).

18. Extrusion head (14) according to claims 1 or 6, characterized in that a lower section (15) of said distribution chamber leads onto an annular extrusion chamber (34) having a constant cross-section in the form of an inverted trapezoid.

19. Extrusion head (14) according to claims 1 or 6, characterized in that a lower section (15) of said distribution chamber opens onto an annular extrusion chamber section which is equipped at said bottom of said distribution chamber with a plate (38) perforated with extrusion apertures and with a grid (36) disposed above said plate for homogenizing said pasty material before it is extruded through the said plate.

20. Extrusion head according to claims 1 or 6, characterized in that said distribution chamber includes heating cartridges (41, 42) associated with said body member.

21. Extrusion head according to claims 1 or 6, characterized in that said distribution chamber includes heating means in at least two sections of said body member, so as to heat the said sections independently.

* * * * *